(12) United States Patent
Yoshino

(10) Patent No.: US 7,931,831 B2
(45) Date of Patent: Apr. 26, 2011

(54) OPTICAL WAVEGUIDE SUBSTRATE MANUFACTURING METHOD

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 48 days.

(21) Appl. No.: 12/434,207

(22) Filed: May 1, 2009

(65) Prior Publication Data

US 2009/0212449 A1    Aug. 27, 2009

Related U.S. Application Data

(63) Continuation of application No. PCT/JP2007/072242, filed on Nov. 9, 2007.

(30) Foreign Application Priority Data

Nov. 9, 2006    (JP) .................................. 2006-303752

(51) Int. Cl.
  *B29D 11/00*    (2006.01)
(52) U.S. Cl. ........ 264/1.27; 264/435; 264/449; 359/326
(58) Field of Classification Search ................ 264/1.27, 264/435, 449; 359/326
See application file for complete search history.

(56) References Cited

U.S. PATENT DOCUMENTS

| 5,652,674 A | 7/1997 | Mizuuchi et al. |
| 6,529,309 B2 * | 3/2003 | Mizuyoshi ..................... 359/280 |
| 6,795,234 B2 * | 9/2004 | Tsuruma ....................... 359/332 |
| 2006/0133767 A1 * | 6/2006 | Yamaguchi et al. .......... 385/147 |

FOREIGN PATENT DOCUMENTS

| JP | 04-335620 A1 | 11/1992 |
| JP | 08-220578 A1 | 8/1996 |
| JP | 2001-066652 A1 | 3/2001 |
| JP | 2003-270687 A1 | 9/2003 |
| JP | 2003-307757 A1 | 10/2003 |
| JP | 2004-045666 A1 | 2/2004 |
| JP | 2005-070194 A1 | 3/2005 |
| JP | 2005-070195 A1 | 3/2005 |

OTHER PUBLICATIONS

U.S. Appl. No. 12/434,243, filed May 1, 2009, Yoshino, Takashi.

* cited by examiner

*Primary Examiner* — Joseph S Del Sole
*Assistant Examiner* — James Sanders
(74) *Attorney, Agent, or Firm* — Burr & Brown

(57) ABSTRACT

A voltage is applied on an interdigitated electrode provided on one main face of a single-domain ferroelectric single crystal substrate to form a periodic domain inversion structure. The interdigitated electrode is then removed. The optical waveguide is then formed in the substrate. An optical intensity center P1 of the optical waveguide is kept away from a location P0 of the end of the interdigitated electrode.

8 Claims, 8 Drawing Sheets

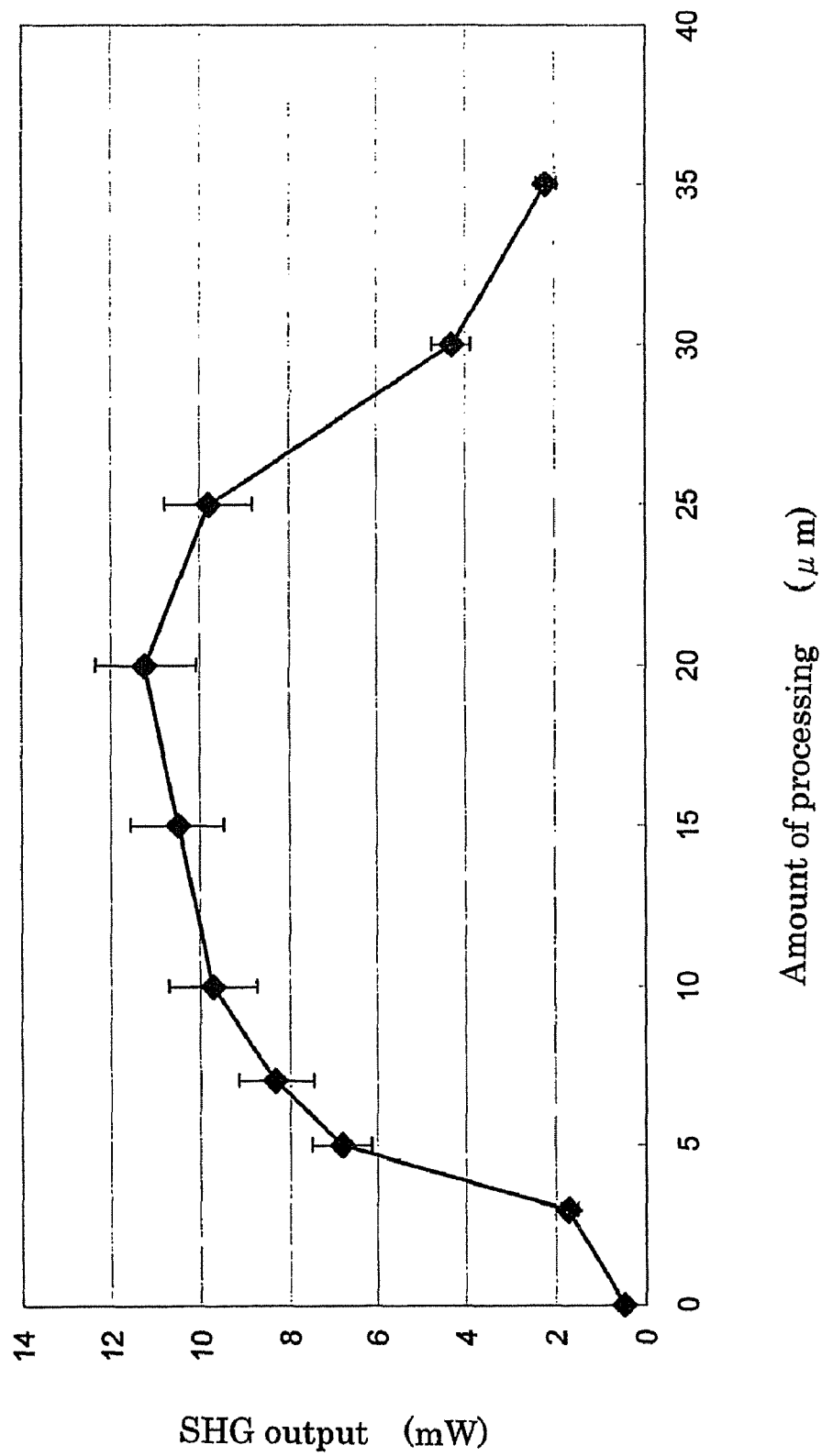

_(1)_

OPTICAL WAVEGUIDE SUBSTRATE MANUFACTURING METHOD

FIELD OF THE INVENTION

The present invention relates to a method for manufacturing an optical waveguide substrate usable for harmonic-generating devices and the like.

BACKGROUND OF THE INVENTION

The periodic formation of a domain inversion structure for forcibly inverting the polarization of ferroelectrics allows the implementation of optical frequency modulators utilizing surface acoustic waves, optical wavelength conversion devices utilizing the polarization inversion of nonlinear polarization, and the like. In particular, if the nonlinear polarization of nonlinear optical materials can be inverted periodically, high-efficiency wavelength conversion devices can be made; when light such as solid lasers is converted by using such devices, it will be possible to make small and lightweight short-wavelength light sources applied for such fields as printing, optical information processing, and optical application measurement control.

As a method of forming a periodic domain inversion structure in a ferroelectric nonlinear optical material, so-called voltage application method is known. In this method, an interdigitated comb-shaped electrode is formed on one main face of a ferroelectric single crystal substrate, a uniform electrode is formed on the other main face, and a pulse voltage is applied across both the electrodes. Such a method is described in Japanese Publication Nos. H08-220578A, 2005-70195A and 2005-70194A.

In order to generate second harmonics from a nonlinear optical material such as a lithium niobate single crystal, there is a need to make periodic domain inversion within the single crystal. Then, the periodic domain inversion structure is formed in a ferroelectric single crystal substrate, following which a ridge channel optical waveguide is formed in a surface of the substrate by machining, laser machining, or the like. At that time, by providing the periodic domain inversion structure within the ridge optical waveguide, fundamental waves incident on the optical waveguide are modulated to higher harmonic waves.

SUMMARY OF THE INVENTION

However, it has been found that when a ridge optical waveguide is formed in a region with a periodic domain inversion structure formed therein and a fundamental wave is incident thereto, a considerable optical loss occurs and thus the harmonic output is extremely low. This is a phenomenon that has not been seen when the periodic domain inversion structure is used as a slab waveguide, and the phenomenon is beyond expectations.

An object of the present invention is, in forming an optical waveguide substrate having a channel optical waveguide with a periodic domain inversion structure formed therein, to reduce optical loss caused in the channel optical waveguide and to enhance the efficiency of harmonic generation.

The present invention provides a method of producing an optical waveguide substrate comprising a channel optical waveguide with a periodic domain inversion structure formed therein.

The method comprises the steps of:

applying a voltage on an interdigitated electrode provided on one main face of a single-domain ferroelectric single crystal substrate to form a periodic domain inversion structure;

removing the interdigitated electrode; and forming a channel optical waveguide in the ferroelectric single crystal substrate. A projected location P2 of an optical intensity center P1 of the optical waveguide on the one main face is kept away from a projected location P0 of the end of the interdigitated electrode on the one main face.

The present inventors have pursued the cause of the problem that in the case where a periodic domain inversion structure is formed within a channel optical waveguide, optical loss in the optical waveguide is increased and the efficiency of harmonic generation is considerably decreased As a result, it has been found that, when a voltage is applied in the step of making periodic domain inversion, damage occurs in a surface region of the ferroelectric single crystal. Such damage and its influence on harmonic generation have not been described in any literature.

As the cause is further investigated in detail, it has been found that while an electric field concentrates at the end edge of the interdigitated electrode and polarization inverted portion extends forward from the end of the electrode. It seems that, at portions under the end of the interdigitated electrode and the peripheries thereof, considerable damage to the crystal or crystal defects are caused. Therefore, it can be considered that in the case where a channel optical waveguide is formed at these portions where polarization efficiency is presumably high, light propagating through the waveguide is affected by the damage.

The inventors have found based on these findings that, as shown in FIGS. 6 and 7 for example, by diagonally keeping the optical intensity center P1 of optical waveguide 20 or 30 away from the location P0 of the end of the interdigitated electrode, optical losses in the waveguide 20 or 30 can be considerably reduced and the efficiency of harmonic generation can be increased, whereby the present invention has been accomplished.

According to the present invention, a distance "m" between the projected location P2 of the optical intensity center P1 of the optical waveguide when projected on the one main face 18a of the substrate and the projected location P0 of the end of the interdigitated electrode is preferably 5 μm or more, more preferably 7 μm or more, and further preferably 10 μm or more.

On the other hand, in the case where the distance "m" between the projected location P2 of the optical intensity center P1 of the optical waveguide when projected on the one main face 18a and the projected location P0 of the end of the interdigitated electrode is too large, the degree of domain inversion becomes small, and thus, the efficiency of harmonic generation decreases. Therefore, from the viewpoint of the enhancement of the efficiency of harmonic generation, the distance "m" between P2 and P0 is preferably 30 μm or less, more preferably 25 μm or less, and further preferably 20 μm or less.

According to the present invention, the optical intensity center P1 of the channel optical waveguide can be determined by observing an image of an end face of the waveguide. That is, an outgoing end face of the waveguide is radiated with light from a lamp, and the image of the waveguide end face is observed by means of a CCD camera. The intensity center is located by launching laser light (laser light with a phase-matched wavelength of, for example, 980 nm) to the other end face of the waveguide, observing a pattern of the guided light at the outgoing end face along with the image of the end face by the CCD camera, and then conducting image analysis (through the use of optical intensity distribution measurement software). P0 is the projected location of the end edge of the interdigitated electrode projected on the main face 8a or 18a in a direction of a normal L of the main face. P2 is the projected location of the location P1 projected on the main face 8a or 18a in the direction of the normal L of the main face.

In the case where the channel optical waveguide is, for example, a ridge optical waveguide 20 illustrated in FIG. 6, the optical intensity center P1 of the ridge optical waveguide corresponds with the geometric center. Further, in the case where the channel optical waveguide is an optical waveguide 30 caused by inner diffusion illustrated in FIG. 7, the geometric center of the optical waveguide 30 cannot be located since the shape of the optical waveguide is indefinite.

BRIEF DESCRIPTION OF THE DRAWINGS

FIG. 8 is a graph showing the relationship between the distances "m" between projected locations P0 and P2 and harmonic outputs.

DETAILED DESCRIPTION OF THE INVENTION

The present invention will be described in further detail below with appropriate reference to the drawings.

Figure 1:
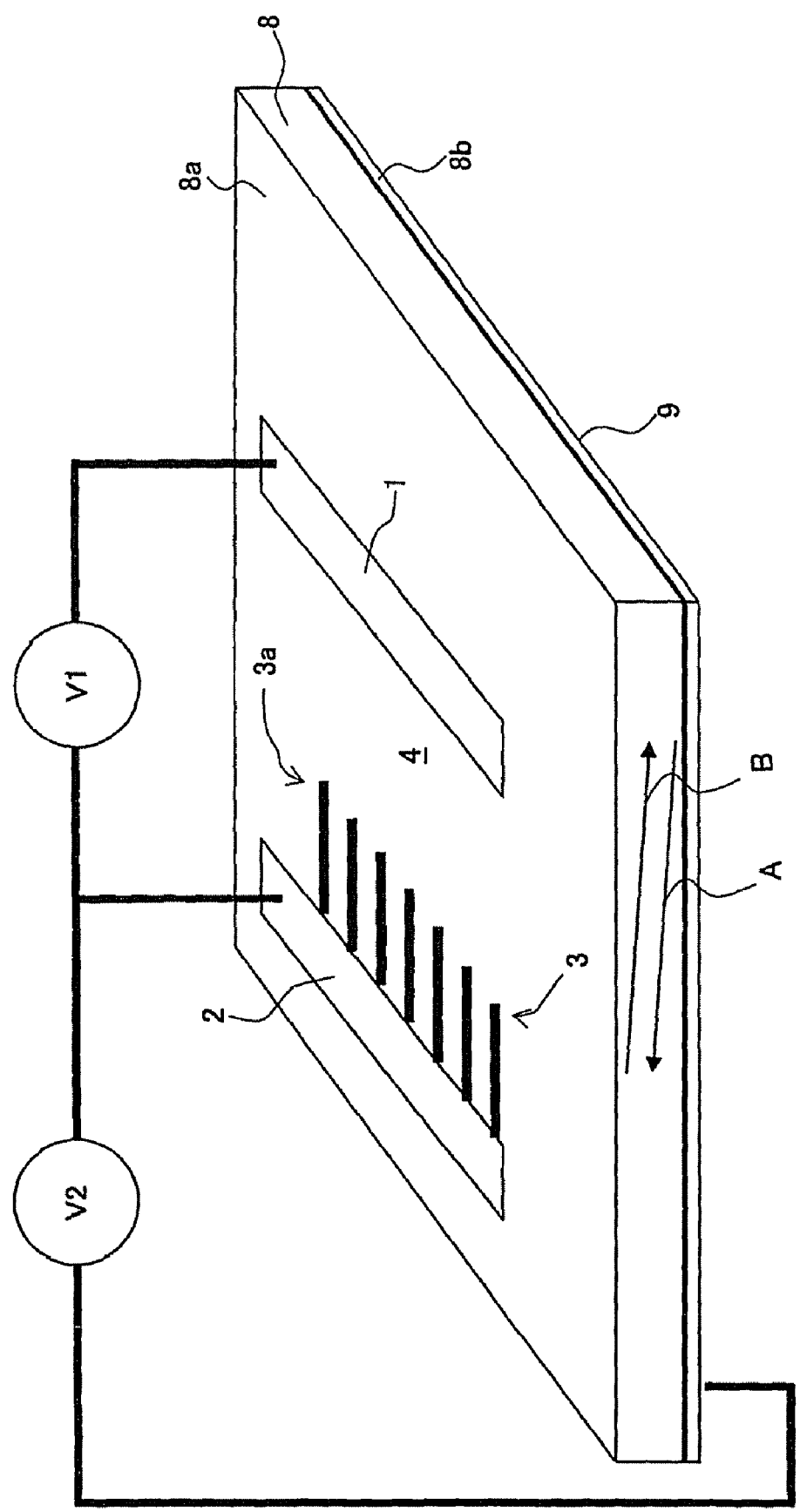
FIG. 1 is a schematic perspective view of a ferroelectric single crystal substrate 8 in which a periodic domain inversion structure is formed by using voltage application method.

To begin with, a periodic domain inversion structure is formed in a ferroelectric single crystal substrate by the voltage application method. For example, as shown in FIG. 1, an offcut substrate of a ferroelectric single crystal is used as a substrate 8. Since a polarization direction A of the ferroelectric single crystal forms a predetermined angle, for example, an angle of 5° with respect to one main face 8a and the other main face 8b, the substrate 8 is called "offcut substrate".

On the one main face 8a of the substrate 8, an interdigitated electrode 3 and a counter electrode 1 are formed; on the other main face 8b thereof, a uniform electrode 9 is formed. The interdigitated electrode 3 has a number of elongated electrode pieces 3a arranged periodically and an elongated power supply portion 2 to which roots of the electrode pieces 3a are connected. The counter electrode 1 is made of an elongated electrode piece, and is provided so as to be opposite to ends of the electrode pieces 3a.

Figure 2:
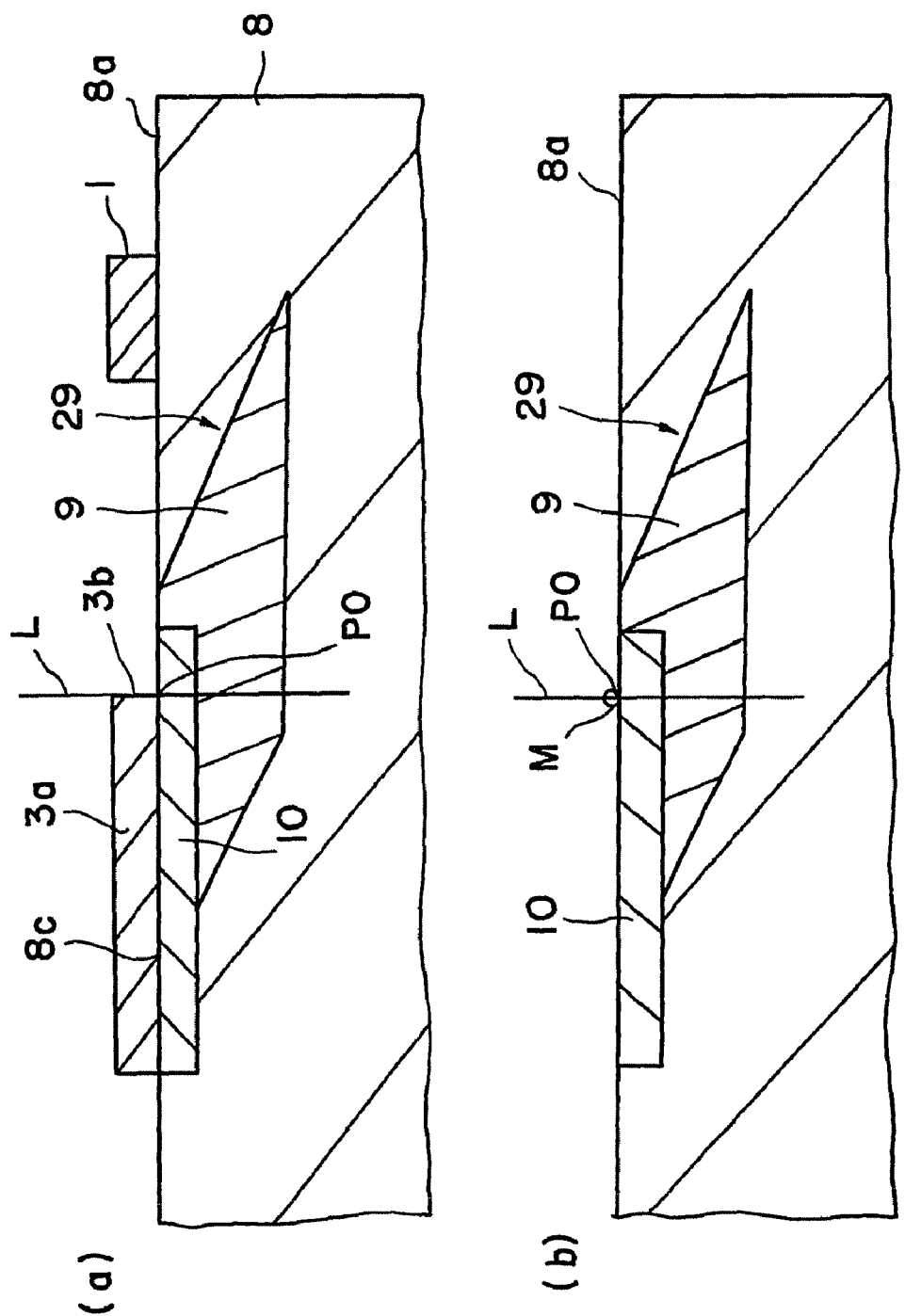
FIG. 2(a) is a cross-sectional view of the ferroelectric single crystal substrate 8 in which a periodic domain inversion structure 29 is formed.
FIG. 2(b) is a cross-sectional view of the ferroelectric single crystal substrate of FIG. 2(a) from which an electrode is removed.

Initially, the whole substrate 8 is polarized in the direction A. Then, a voltage V1 is applied between the interdigitated electrode 3 and the counter electrode 1, and a voltage V2 is applied between the interdigitated electrode 3 and the uniform electrode 9. As a result, as shown in FIG. 2(a), polarization-inverted portions gradually extend from the ends 3b of the individual electrode pieces 3a in a direction parallel to a direction B. The polarization inversion direction B is opposite to the polarization noninversion direction A. And further, at places not corresponding to the electrode, that is, between the adjacent polarization-inverted portions, there are polarization-noninverted portions where polarization inversion does not occur. In this manner, a periodic domain inversion structure 29 is formed where the polarization-inverted portions and the polarization-noninverted portions are alternately arranged.

In this case, however, it has been found that a damaged layer 10 is formed immediately under the interdigitated electrode 3a and around the end edge 3b on the surface region of the one main face 8a of the substrate 8.

In order to form the periodic domain inversion structure in a channel optical waveguide, the interdigitated electrode 3 is then removed to form a structure illustrated in FIG. 2(b). In this figure, P0 denotes a projected location where the end 3b of each electrode piece 3a of the interdigitated electrode 3 is projected on the one main face 8a.

The projected location P0 of the end of the interdigitated electrode is determined by means of an alignment mark M previously prepared. The alignment mark can be made using a metallic pattern formed by a conventional photolithographic process or the like.

At this point, it is also possible to form a channel optical waveguide in the ferroelectric single crystal substrate 8 in accordance with the present invention. In a preferred embodiment, however, after the interdigitated electrode is removed from the substrate, the substrate is adhered to a supporting body, and then, the substrate is processed from the other main face to be thinned. By thinning the ferroelectric single crystal substrate, the level of light confinement within the optical waveguide is strengthened and the efficiency of conversion to harmonic is enhanced, while a desired mechanical strength can be provided even when the substrate is thinned.

Figure 3:
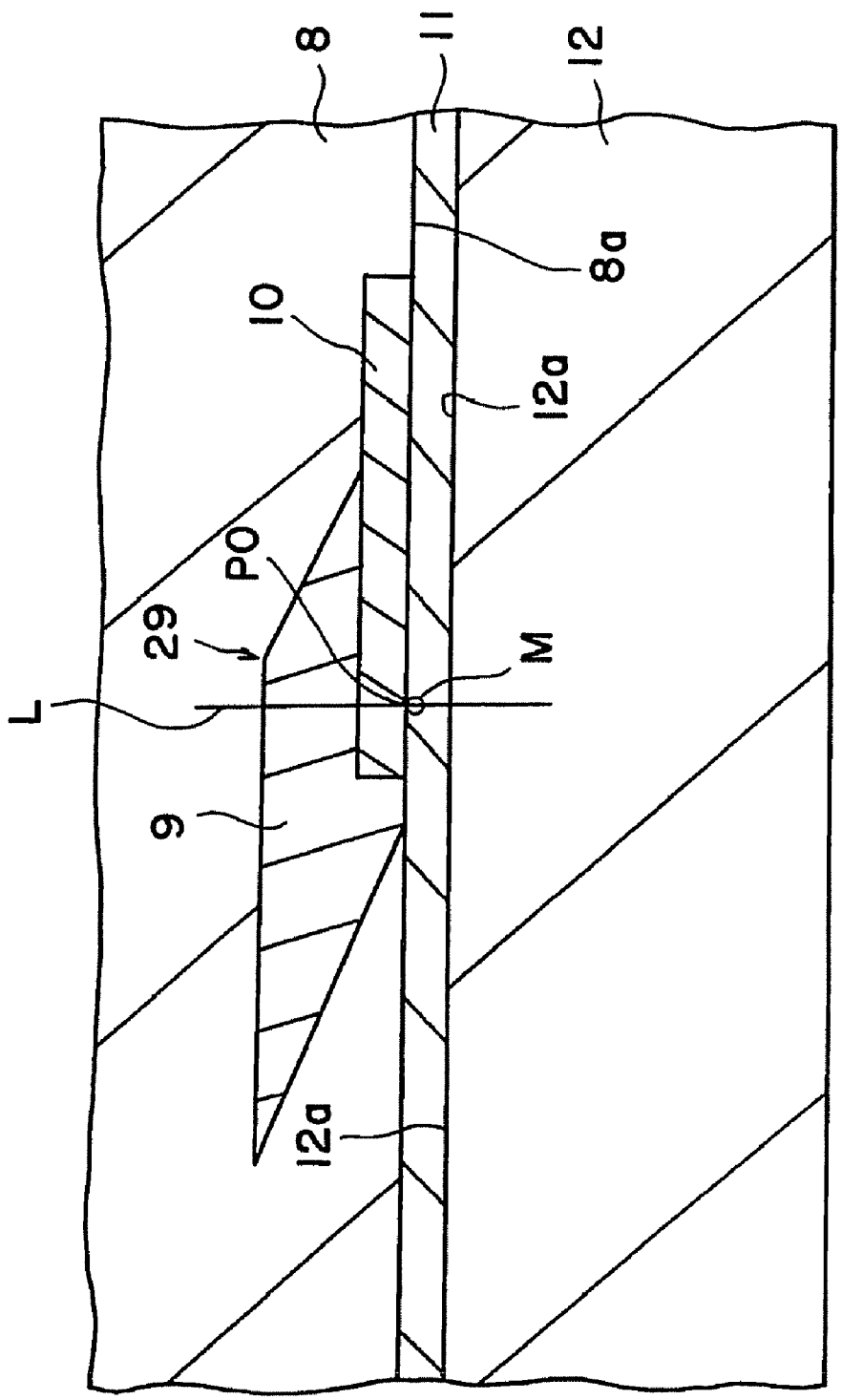
FIG. 3 is a cross-sectional view of the ferroelectric single crystal substrate 8 adhered to a supporting body 12.

In this embodiment, as shown in FIG. 3, the one main face 8a of the ferroelectric single crystal substrate 8 is adhered to a surface 12a of the supporting body 12. Then, the other main face 8b of the substrate 8 is ground to thin the substrate 8.

Figure 4:
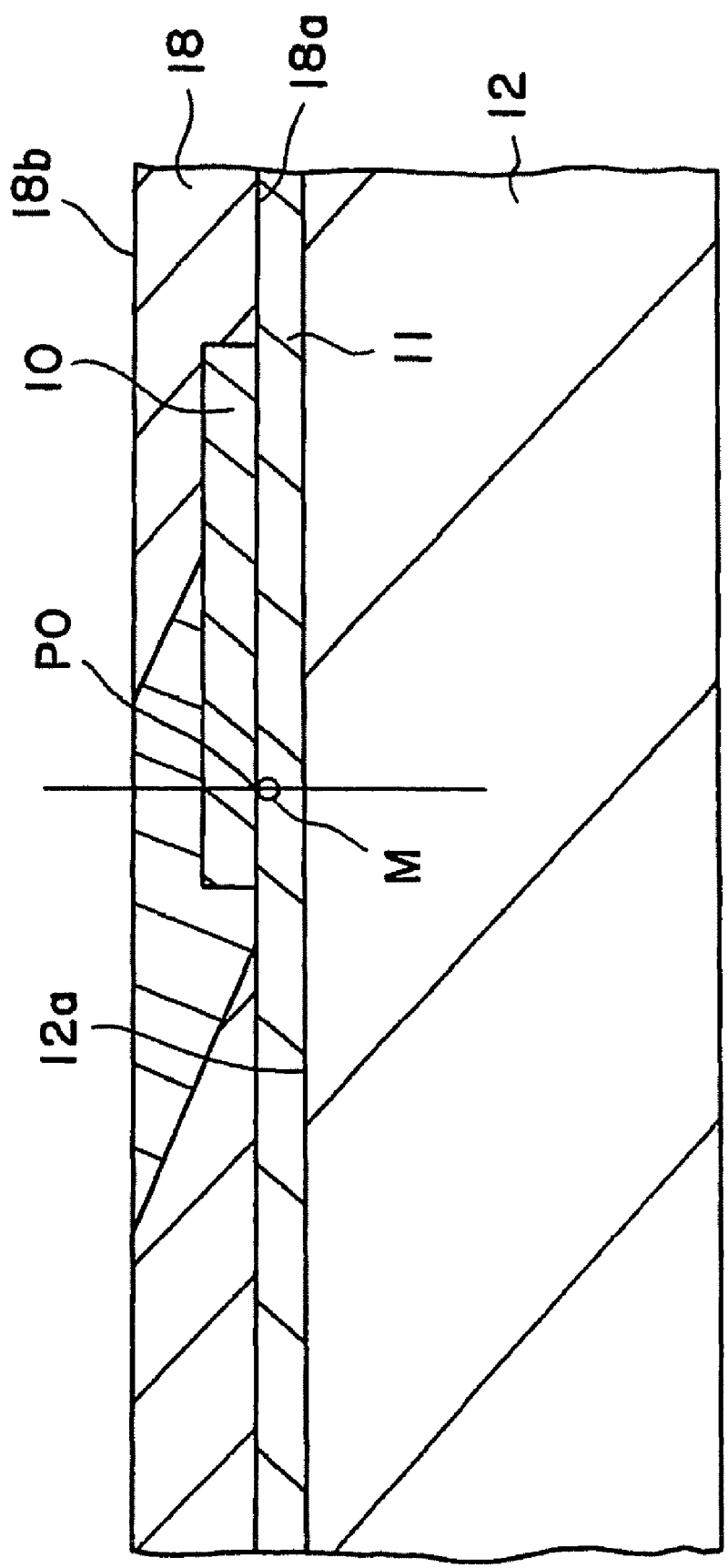
FIG. 4 is a cross-sectional view of an optical waveguide device in which a thin ferroelectric single crystal substrate 18 is made by processing the ferroelectric single crystal substrate 8 of FIG. 3.

As a result, as shown in FIG. 4, a substrate 18 is thinned. Reference number 18a denotes the one main face of the substrate 18, and reference number 18b denotes the other main face. The substrate 18 is adhered to the surface 12a of the supporting body 12 via an adhesion layer 11. At this point, the alignment mark "M" should be observed from the back surface 18b.

Figure 5:
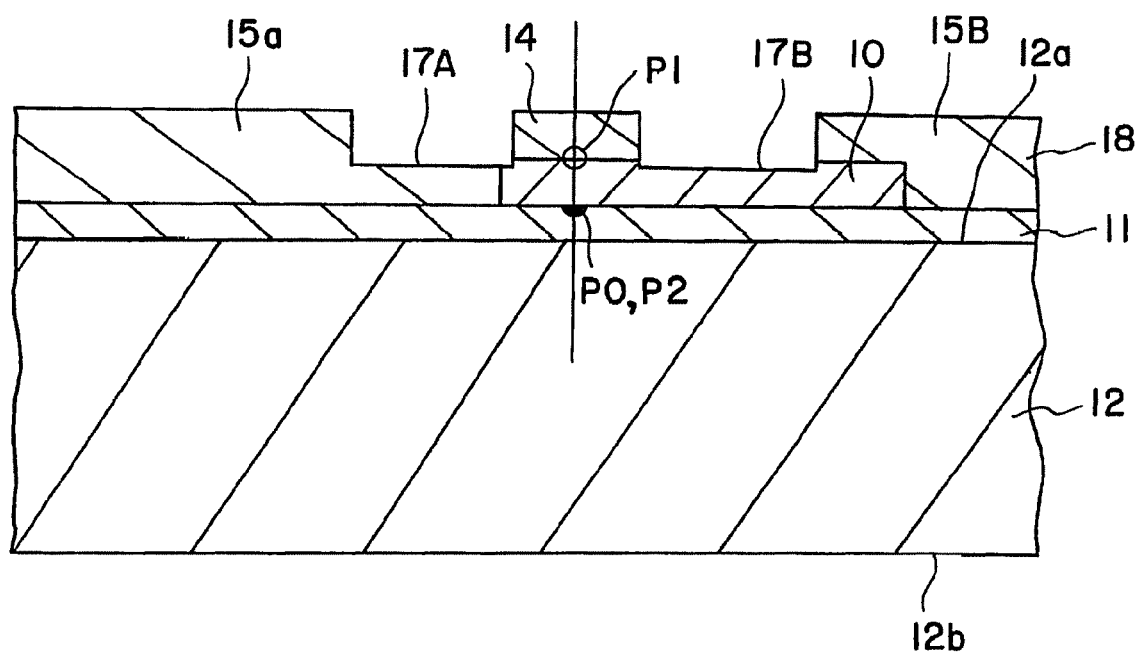
FIG. 5 is a cross-sectional view of a conventional optical waveguide device in which a ridge optical waveguide 14 is formed.

Thereafter, as shown in FIG. 5, by processing the substrate 18 from the other main face thereof, a ridge optical waveguide 14 is formed. In this case, by processing the ferroelectric single crystal substrate 18, a pair of grooves 17A and 17B are formed and extending portions 15A and 15B are made to remain on both sides of the grooves. Between the pair of grooves 17A and 17B, a ridge 14 is formed.

In such a structure, the ridge optical waveguide 14 has been heretofore designed such that the optical intensity center P1 is located on the projected location P0 of the end of the interdigitated electrode. This is because it has been considered that the end of the interdigitated electrode is high in voltage and the domain inversion structure can be reliably formed.

In the structure illustrated in FIG. 5, however, it has been found that the efficiency of harmonic generation considerably falls to an unexplainable extent in actuality. In the course of the consideration of the reason for the above, it has been thought that the damaged layer 10 is formed in the region under the interdigitated as shown in FIG. 5, and the damaged layer 10 causes the losses of fundamental waves and harmonics propagating through the optical waveguide 14.

Figure 6:
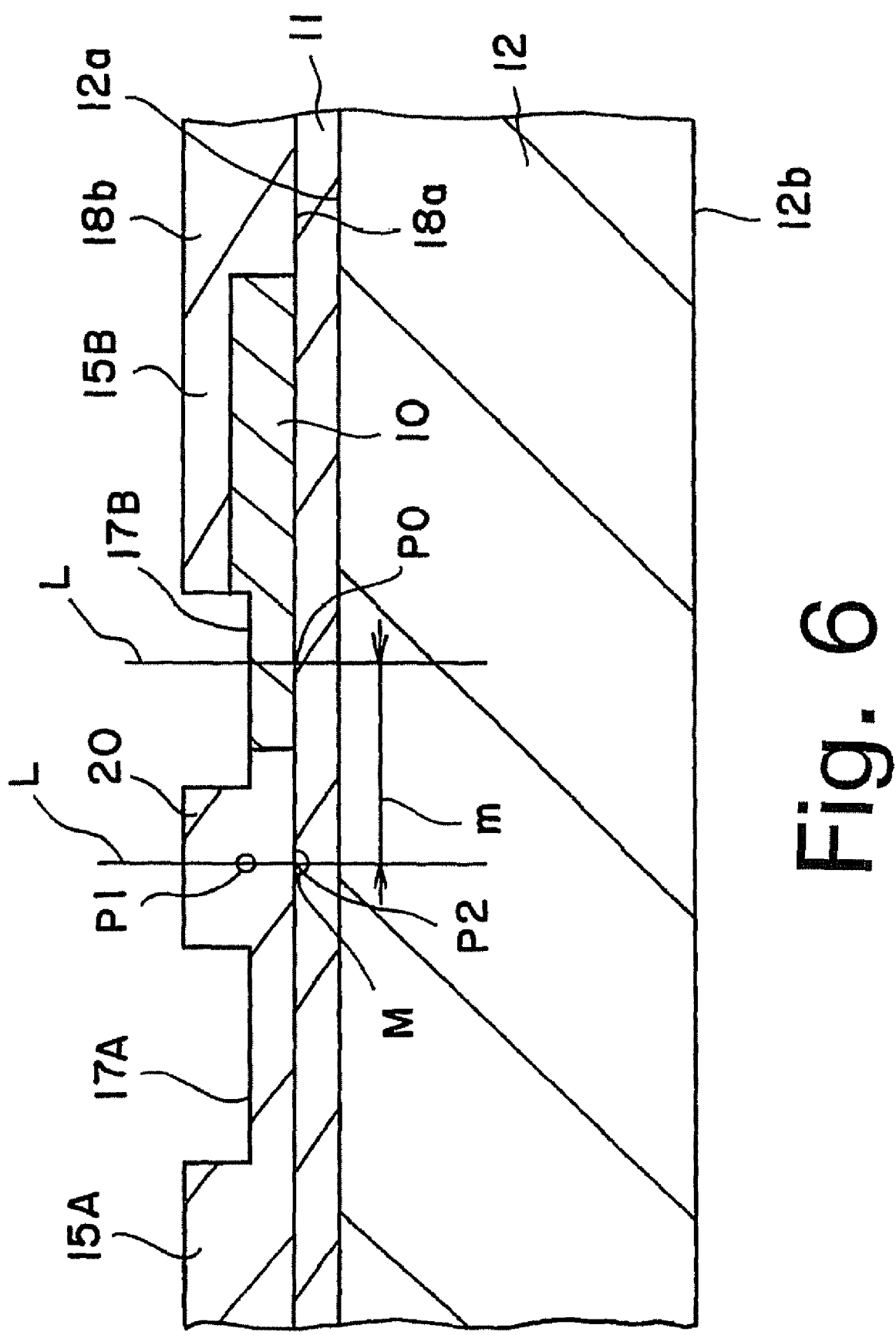
FIG. 6 is a cross-sectional view of an optical waveguide device of the present invention in which a ridge optical waveguide 20 is formed.

In order to substantiate such a thought, the present inventors, as shown in FIG. 6 for example, have attempted to keep the damaged layer 10 away from the region immediately under the optical intensity center P1 of a ridge optical waveguide 20 and the periphery of the region, by diagonally keeping the optical intensity center P1 of the ridge optical waveguide 20 away from the location P0 of the end of the interdigitated electrode. Consequently, it has been found that the efficiency of conversion of the fundamental wave in the optical waveguide 20 is considerably enhanced.

Figure 7:
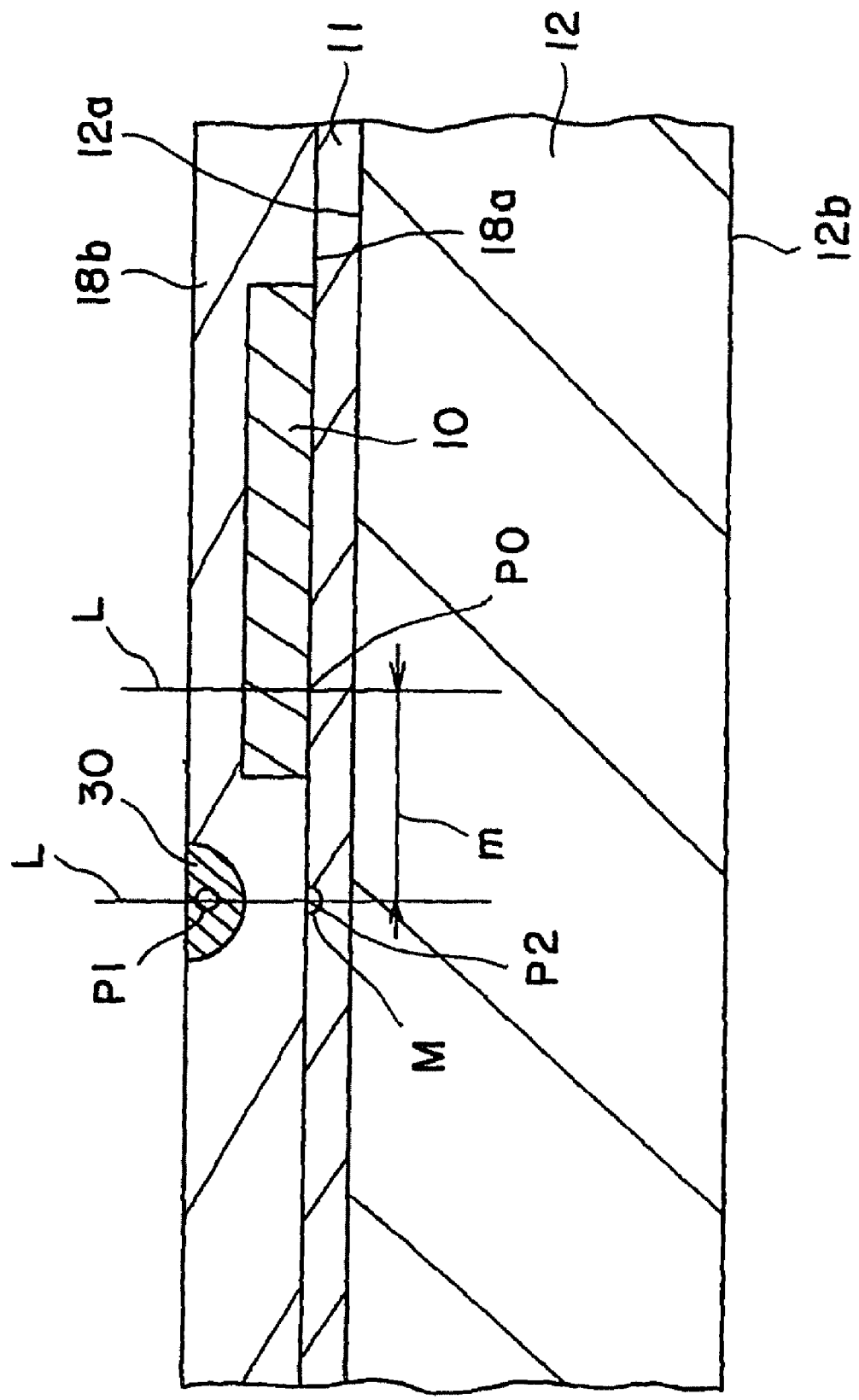
FIG. 7 is a cross-sectional view of the optical waveguide device of the present invention in which a diffused optical waveguide 30 is formed.

In an optical waveguide 30 formed through inner diffusion as shown in FIG. 7 as well, the inventors have attempted to keep the damaged layer 10 away from the region immediately under the optical intensity center P1 of the ridge optical waveguide 30 and the periphery of the region, by diagonally keeping the optical intensity center P1 of the optical waveguide 30 away from the location P0 of the end of the interdigitated electrode. Consequently, it has been found that the efficiency of conversion of the fundamental wave in the optical waveguide 30 is considerably enhanced.

The type of ferroelectric single crystal of which the ferroelectric single crystal substrate is to be formed is not limited; but a single crystal of lithium niobate ($LiNbO_3$), lithium tantalate ($LiTaO_3$), a lithium niobate-lithium tantalate solid solution, or $K_3Li_2Nb_5O_{15}$ is particularly preferred.

In order to further enhance the optical damage resistance of the three-dimensional optical waveguide, one or more metallic element(s) selected from the group consisting of magnesium (Mg), zinc (Zn), scandium (Sc) and indium (In) can be contained in the ferroelectric single crystal; magnesium is particularly preferred. From the viewpoint of the fulfillment of definite domain inversion characteristics (conditions), particular preference is given to any one of a lithium niobate single crystal, a lithium niobate-lithium tantalate solid solution single crystal, and a lithium tantalate single crystal each containing magnesium. And further, in the ferroelectric single crystal, a rare earth element can be contained as a dope component. Such a rare earth element acts as an additional element for laser oscillation. As the rare earth element, Nd, Er, Tm, Ho, Dy, or Pr is particularly preferred.

It is particularly preferred that a so-called Z-cut substrate, offcut X substrate, or offcut Y substrate is used as the substrate. When an offcut X substrate or an offcut Y substrate is used, the offcut angle is not particularly limited; but particularly preferably, the offcut angle is 1° or larger or 20° or less. When an X-cut substrate or a Y-cut substrate is used, the uniform electrode is provided on the one main face of the substrate, not provided on the back surface of the substrate, so that a voltage can be applied between the interdigitated electrode and the uniform electrode. In this case, the counter electrode need not be provided, but may be left as a floating electrode. And further, when a Z-cut substrate is used, the uniform electrode can be provided on the back surface of the substrate and a voltage can be applied between the interdigitated electrode and the uniform electrode. In this case, the counter electrode is not necessarily required, but may be left as a floating electrode.

In forming the periodic domain inversion structure, materials for the interdigitated electrode, the counter electrode, and the uniform electrode are not limited; but preference is given to Al, Au, Ag, Cr, Cu, Ni, Ni—Cr, Pd, or Ta. Moreover, a method for forming the interdigitated electrode, the counter electrode, and the uniform electrode is not particularly limited; examples of such method include vacuum evaporation and vacuum sputtering. The applied voltage is preferably 3 kV to 8 kV, and the pulse frequency is preferably 1 Hz to 1000 Hz.

A material for the supporting body to be adhered to the ferroelectric single crystal substrate is required to have excellent insulating properties, a uniform volume resistivity within the material, and a predetermined structural strength. Examples of such a material include silicon, sapphire, quartz, glass, lithium niobate, lithium tantalate, a lithium niobate-lithium tantalate solid solution, MgO-doped lithium niobate, MgO-doped lithium tantalate, ZnO-doped lithium niobate, and ZnO-doped lithium tantalate.

A material for the adhesive for adhering the ferroelectric single crystal substrate to the supporting body is not particularly limited; examples of an adhesive include acrylic and epoxy ultraviolet curing resins, acrylic and epoxy thermosetting resins, and acrylic and epoxy ultraviolet curing, thermosetting resins.

The process location of the optical waveguide is determined by measuring a distance between the alignment mark "M" and the estimated location of the optical intensity center of the optical waveguide through the use of a microscope attached to a processing apparatus. In the case of a ridge optical waveguide, the distance between the geometric center of the ridge optical waveguide and the projected location P0 is determined by determining the locations of the grooves 17A and 17B based on the location of the alignment mark "M". And further, in the case of a metal inner-diffused optical waveguide, the position of a mask for forming a thin film from titanium, zinc or the like prior to diffusion is determined based on the location of the alignment mark "M". Moreover, in the case of a proton exchanged optical waveguide, the position of a mask for use in proton exchange is determined based on the location of the alignment mark "M".

A method for forming the channel optical waveguide is not particularly limited. For example, the ridge optical waveguide can be formed by laser ablation, grinding, dry etching, or wet etching.

The periodic polarization-inverted portion formed according to the present invention is applicable to any optical devices requiring such polarization-inverted portion. Examples of such optical devices include harmonic-generating devices such as second harmonic-generating devices and so on. When used as a second harmonic-generating device, the wavelength of harmonics is preferably 330 to 1600 nm.

EXAMPLES

An optical waveguide substrate having the structure illustrated in FIG. 5 (Comparative Example) or FIG. 6 (Example) was produced using the method described with reference to FIGS. 1 to 6.

In particular, on the MgO 5% doped lithium niobate-5 degree offcut Y substrate 8 of 0.5-mm-thick, the interdigitated electrode 2 and the counter electrode 1 were formed by photolithography method. The distances between the electrode pieces 3a were set at 5.10 μm. The uniform electrode 9 was formed on the entire bottom surface 8b of the substrate 8. Then, the periodic domain inversion structure 29 was formed by applying a pulse voltage (see FIG. 2(a)). Then, the electrodes were removed from the substrate.

Next, the adhesive 11 was applied to the 1-mm-thick non-doped lithium niobate substrate 12, following which the substrate 12 and the MgO-doped lithium niobate substrate 8 were bonded together (see FIG. 3). The MgO-doped lithium niobate substrate 8 was ground and polished from the other main face 8b side until the thickness reached 3.4 µm (see FIG. 4). Then, the ridge optical waveguides 14 and 20 were formed by a laser ablation processing method. The widths of the ridges 14 and 20 formed were 4.5 µm, and the depths of the grooves 17A and 17B were 2 µm. After the formation of the ridges, a 0.5-µm-thick $SiO_2$ film was formed on the surface of the waveguide by sputtering. The substrate was cut with a dicer to form optical waveguide devices of 12 mm in length and 1.4 mm in width. Then, both end faces of each device were polished.

The optical characteristics of the obtained devices were determined by means of a titanium-sapphire laser. By adjusting the oscillation output of the laser to 100 mW and condensing the fundamental light to the end face of the optical waveguide through a lens, an output of 60 mW could be produced in the waveguide. The wavelength of the titanium-sapphire laser was changed to adjust to a wavelength to be phase-matched, so that the maximum output of the second harmonics can be obtained. Then, the distances "m" between the projected locations P2 and P0 of FIG. 6 were set as shown in Table 1. The maximum output of each case is presented in Table 1 and FIG. 8.

TABLE 1

| m (µm) | Output of second harmonic Wave (mW) |
| --- | --- |
| 0.0 | <1 |
| 3.0 | 1.7 |
| 5.0 | 6.8 |
| 7.0 | 8.3 |
| 10.0 | 9.7 |
| 15.0 | 10.5 |
| 20.0 | 11.2 |
| 25.0 | 9.8 |
| 30.0 | 4.3 |
| 35.0 | 2.2 |

As seen from the results, the harmonic output is considerably increased by keeping the optical intensity center of the optical waveguide away from the location of the end of the interdigitated electrode. In the optical waveguide device according to this example, the harmonic output was increased particularly considerably by setting the distances m between the locations P2 and P0 at 5 to 30 µm.

Although the specific embodiments of the present invention has been described hereinabove, the invention is not limited to the embodiment, and there can be practiced while making various modifications and alterations without departing from the scope of the appended claims.

The invention claimed is:

1. A method of producing a device comprising an optical waveguide substrate and a supporting body, said optical waveguide substrate comprising a channel optical waveguide with a periodic domain inversion structure formed therein, the method comprising the steps of:
    applying a voltage on an interdigitated electrode provided on a first main face of a single-domain ferroelectric single crystal substrate to form a periodic domain inversion structure;
    then removing the interdigitated electrode from the first main face of the ferroelectric single crystal substrate;
    then adhering the first main face of the ferroelectric single crystal substrate to the supporting body;
    then thinning the ferroelectric single crystal substrate from a second main face of the ferroelectric single crystal substrate to provide the optical waveguide substrate; and
    then forming the channel optical waveguide in the optical waveguide substrate,
    wherein a projected location P2 of an optical intensity center P1 of the optical waveguide on a first main face of the optical waveguide substrate adhered to the supporting body is kept away from a projected location P0 of the end of the interdigitated electrode on the first main face of the optical waveguide substrate.

2. The method of claim 1, wherein the projected location P2 of the optical intensity center P1 of the optical waveguide on the first main face and the projected location P0 of the end of the interdigitated electrode on the first main face are spaced apart by a distance of 5 µm or more.

3. The method of claim 2, wherein the projected location P2 of the optical intensity center P1 of the optical waveguide on the first main face and the projected location P0 of the end of the interdigitated electrode on the first main face are spaced apart by a distance of 30 µm or less.

4. The method of claim 1, wherein the ferroelectric single crystal substrate comprises a single crystal selected from the group consisting of a lithium niobate single crystal, a lithium tantalate single crystal and a lithium niobate-lithium tantalate solid solution single crystal.

5. The method of claim 1, wherein the ferroelectric single crystal substrate comprises a Z-cut substrate.

6. The method of claim 1, further comprising the step of providing an alignment mark M indicating the projected location P0 of the end of the interdigitated electrode on the ferroelectric single crystal substrate before the ferroelectric single crystal substrate is thinned.

7. The method of claim 6, wherein the alignment mark M is observed from the second main face of the ferroelectric single crystal substrate.

8. The method of claim 7, wherein the projected location P2 of the optical intensity center P1 of the optical waveguide on the first main face of the optical waveguide substrate is determined with respect to the alignment mark M.

* * * * *